United States Patent
Mozaffari et al.

(10) Patent No.: US 12,021,709 B2
(45) Date of Patent: Jun. 25, 2024

(54) NETWORK DESIGN AND OPTIMIZATION USING DEEP LEARNING

(71) Applicant: Telefonaktiebolaget LM Ericsson (publ), Stockholm (SE)

(72) Inventors: Mohammad Mozaffari, Fremont, CA (US); Xingqin Lin, San Jose, CA (US); Talha Khan, Santa Clara, CA (US); Mehrnaz Afshang, Fremont, CA (US); Yun Chen, Austin, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/248,237

(22) PCT Filed: Dec. 11, 2020

(86) PCT No.: PCT/IB2020/061851
§ 371 (c)(1),
(2) Date: Apr. 6, 2023

(87) PCT Pub. No.: WO2022/074444
PCT Pub. Date: Apr. 14, 2022

(65) Prior Publication Data
US 2023/0388196 A1 Nov. 30, 2023

Related U.S. Application Data

(60) Provisional application No. 63/090,096, filed on Oct. 9, 2020.

(51) Int. Cl.
*H04L 41/14* (2022.01)
*H04L 41/16* (2022.01)
*H04W 24/02* (2009.01)

(52) U.S. Cl.
CPC .......... *H04L 41/145* (2013.01); *H04L 41/16* (2013.01); *H04W 24/02* (2013.01)

(58) Field of Classification Search
CPC ...... H04L 41/145; H04L 41/16; H04W 16/18; H04W 16/22; H04W 24/08; H04W 28/00;
(Continued)

(56) References Cited

U.S. PATENT DOCUMENTS 10,396,919 B1 * 8/2019 O'Shea .............. H04L 25/0254
2018/0019910 A1 1/2018 Tsagkaris et al.
(Continued)

OTHER PUBLICATIONS

Xu et al., "EDA based Deep Neural Network Parameter Optimization," ACM, 2019. (Year: 2019).*
(Continued)

*Primary Examiner* — Alina A Boutah
(74) *Attorney, Agent, or Firm* — Nicholson De Vos Webster & Elliott LLP

(57) ABSTRACT

A method and apparatus for design and optimization of a network are described. A first deep neural network is used to obtain a function that represents a relationship between design parameters of the network and network performance metrics of the network. A second deep neural network is used to obtain a subset of one or more candidate network deployment configurations that optimize the performance metrics for the network. An optimal candidate network deployment configuration for the network is selected from the subset of candidate network deployment configurations wherein the optimal candidate network deployment configuration maximizes performance of the network as defined based on the performance metrics.

15 Claims, 12 Drawing Sheets

(58) Field of Classification Search
CPC ... H04W 28/02; H04W 28/021; H04B 17/3913; H04B 28/00; H04B 28/02; H04B 28/021
See application file for complete search history.

(56) References Cited

U.S. PATENT DOCUMENTS

| | | | |
|---|---|---|---|
| 2019/0014487 A1* | 1/2019 | Yang | G06N 3/084 |
| 2019/0239095 A1* | 8/2019 | Ouyang | G06N 3/04 |
| 2020/0169895 A1* | 5/2020 | Chen | G06N 3/045 |
| 2022/0158703 A1* | 5/2022 | Jiang | H04W 24/10 |
| 2023/0262683 A1* | 8/2023 | Saxena | H04W 72/54 |
| | | | 370/329 |

OTHER PUBLICATIONS

Afonso, et al., "Cellular for the skies: Exploiting mobile network infrastructure for low altitude air-to-ground communications," IEEE Aerospace and Electronic Systems Magazine, vol. 31, No. 8, Aug. 2016, pp. 4-11.

Bujokas, E., "Creating Word Embeddings: Coding the Word2Vec Algorithm in Python using Deep Learning," Towards Data Science, Medium, Mar. 4, 2020, pp. 1-16.

Caldwell, et al., "Deep optimisation: Solving combinatorial optimisation problems using deep neural networks," arXiv preprint arXiv:1811.00784, Nov. 2, 2018, pp. 1-9.

Cogalan, et al., "Operating an in-cabin femto-cellular system within a given LTE cellular network," IEEE Transactions on Vehicular Technology, vol. 67, No. 8, Aug. 2018, pp. 7677-7689.

Glorot, et al., "Deep sparse rectifier neural networks," Proceedings of the 14th international conference on artificial intelligence and statistics, Apr. 2011, pp. 315-323.

Kingma, et al., "Adam: A method for stochastic optimization," published as a conference paper at the 3rd International Conference for Learning Representations, San Diego, 2015, arXiv preprint arXiv:1412.6980, v9, Jan. 30, 2017, pp. 1-15.

Krichene, et al., "An aeronautical visible light communication system to enable in-flight connectivity," Proc. IEEE 17th International Conference on Transparent Optical Networks (ICTON), Aug. 2015, pp. 1-6.

Lin, et al., "5G New Radio: Unveiling the Essentials of the Next Generation Wireless Access Technology," Jun. 2018, pp. 1-8.

Lin, et al., "Sky high 5G: New radio for air-to-ground communications," arXiv preprint arXiv:2003.06361, Mar. 13, 2020, pp. 1-7.

Liu, L., "Performance evaluation of direct air-to-ground communication using new radio (5G)," KTH Royal Institute of Technology School of Electrical Engineering, Degree Project in Electrical Engineering, Second Cycle, Stockholm, Sweden, Aug. 2017, pp. 1-56.

Mikolov, et al., "Efficient estimation of word representations in vector space," arXiv preprint arXiv:1301.3781, Sept. 7, 2013, pp. 1-12.

Mozaffari, et al., "A tutorial on UAVs for wireless networks: Applications, challenges, and open problems," IEEE Commun. Surveys Tuts., vol. 21, No. 3, third quarter, Mar. 17, 2019, pp. 2334-2360.

Pytorch, "Word Embeddings in Pytorch," Word Embeddings: Encoding Lexical Semantics, PyTorch Tutorials 1.7.1 documentation, downloaded from https://pytorch.org/tutorials/beginner/nlp/word_embeddings_tutorial.html on Dec. 14, 2020, p. 2 of 5.

Rula, et al., "Mile high WiFi: A first look at in-flight internet connectivity," Proceedings of the World Wide Web Conference, Apr. 2018, pp. 1449-1458.

Shi, et al., "An iteratively weighted MMSE approach to distributed sum-utility maximization for a MIMO interfering broadcast channel," IEEE Transactions on Signal Processing, vol. 59, No. 9, Sep. 2011, pp. 4331-4340.

Sipser, M., "Introduction to the theory of computation," ACM SIGACT News, vol. 27, No. 1, Mar. 1, 1996, pp. 27-29.

Sun, et al., "Learning to optimize: Training deep neural networks for wireless resource management," in in Proc. IEEE 18th International Workshop on Signal Processing Advances in Wireless Communications (SPAWC), May 26, 2017, pp. 1-6.

Tadayon, et al., "Inflight broadband connectivity using cellular networks," IEEE Access, vol. 4, Mar. 2016, pp. 1595-1606.

Vondra, et al., "Performance study on seamless DA2GC for aircraft passengers toward 5G," IEEE Communications Magazine, vol. 55, No. 11, Nov. 2017, pp. 194-201.

Yu, et al., "A deep learning approach for maximum activity links in D2D communications," Sensors, vol. 19, No. 13, Jul. 3, 2019, pp. 1-17.

* cited by examiner

NETWORK DESIGN AND OPTIMIZATION USING DEEP LEARNING

CROSS-REFERENCE TO RELATED APPLICATIONS

This application is a National stage of International Application No. PCT/IB2020/061851, filed Dec. 11, 2020, which claims priority to U.S. Provisional Application No. 63/090,096, filed Oct. 9, 2020, which are all hereby incorporated by reference.

TECHNICAL FIELD

Embodiments of the invention relate to the field of networking; and more specifically, to network design and optimization using deep learning.

BACKGROUND ART

Evolved Packet System (EPS) is specified in 3r d Generation Partnership Project (3GPP) Release 8. EPS is based on the Long-Term Evolution (LTE) radio network and the Evolved Packet Core (EPC). It was originally intended to provide voice and mobile broadband (MBB) services but has continuously evolved to broaden its functionality. Release 13 Narrowband Internet of Things (NB-IoT) and LTE for Machine type communication (LTE-M) are part of the LTE specifications and provide connectivity to massive machine type communications (mMTC) services.

In 3GPP Release 15, the first release of the 5G system was developed. 5G is a new generation's radio access technology intended to serve use cases such as enhanced mobile broadband (eMBB), ultra-reliable and low latency communication (URLLC) and Massive Machine-Type Communications (mMTC). 5G includes the New Radio (NR) access stratum interface and the 5G Core Network (5GC). The NR physical and higher layers reuse parts of the LTE architecture and add to it components that can be used for different use cases.

SUMMARY

One general aspect includes a method of design and optimization of a network. The method includes using a first deep neural network to obtain a function that represents a relationship between one or more design parameters of the network and one or more network performance metrics of the network; using a second deep neural network to obtain a subset of one or more candidate network deployment configurations that optimize the performance metrics for the network, where a candidate from the candidate network deployment configurations is defined based on respective design parameters; and selecting from the subset of candidate network deployment configurations an optimal candidate network deployment configuration for the network, where the optimal candidate network deployment configuration maximizes performance of the network as defined based on the performance metrics.

In one general aspect of the method, the network is a radio access network.

One general aspect includes a non-transitory machine-readable storage medium that provides instructions that, if executed by a processor, will cause the processor to perform operations including, using a first deep neural network to obtain a function that represents a relationship between one or more design parameters of the network and one or more network performance metrics of the network; using a second deep neural network to obtain a subset of one or more candidate network deployment configurations that optimize the performance metrics for the network, where a candidate from the candidate network deployment configurations is defined based on respective design parameters; and selecting from the subset of candidate network deployment configurations an optimal candidate network deployment configuration for the network, where the optimal candidate network deployment configuration maximizes performance of the network as defined based on the performance metrics.

In one general aspect of the non-transitory machine-readable storage medium, the network is a radio access network.

One general aspect includes an apparatus for design and optimization of a network. The apparatus includes a non-transitory machine-readable storage medium that provides instructions that, if executed by a processor, will cause the apparatus to perform operations including, using a first deep neural network to obtain a function that represents a relationship between one or more design parameters of the network and one or more network performance metrics of the network; using a second deep neural network to obtain a subset of one or more candidate network deployment configurations that optimize the performance metrics for the network, where a candidate from the candidate network deployment configurations is defined based on respective design parameters; and selecting from the subset of candidate network deployment configurations an optimal candidate network deployment configuration for the network, where the optimal candidate network deployment configuration maximizes performance of the network as defined based on the performance metrics.

In one general aspect of the apparatus, the network is a radio access network.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1A:
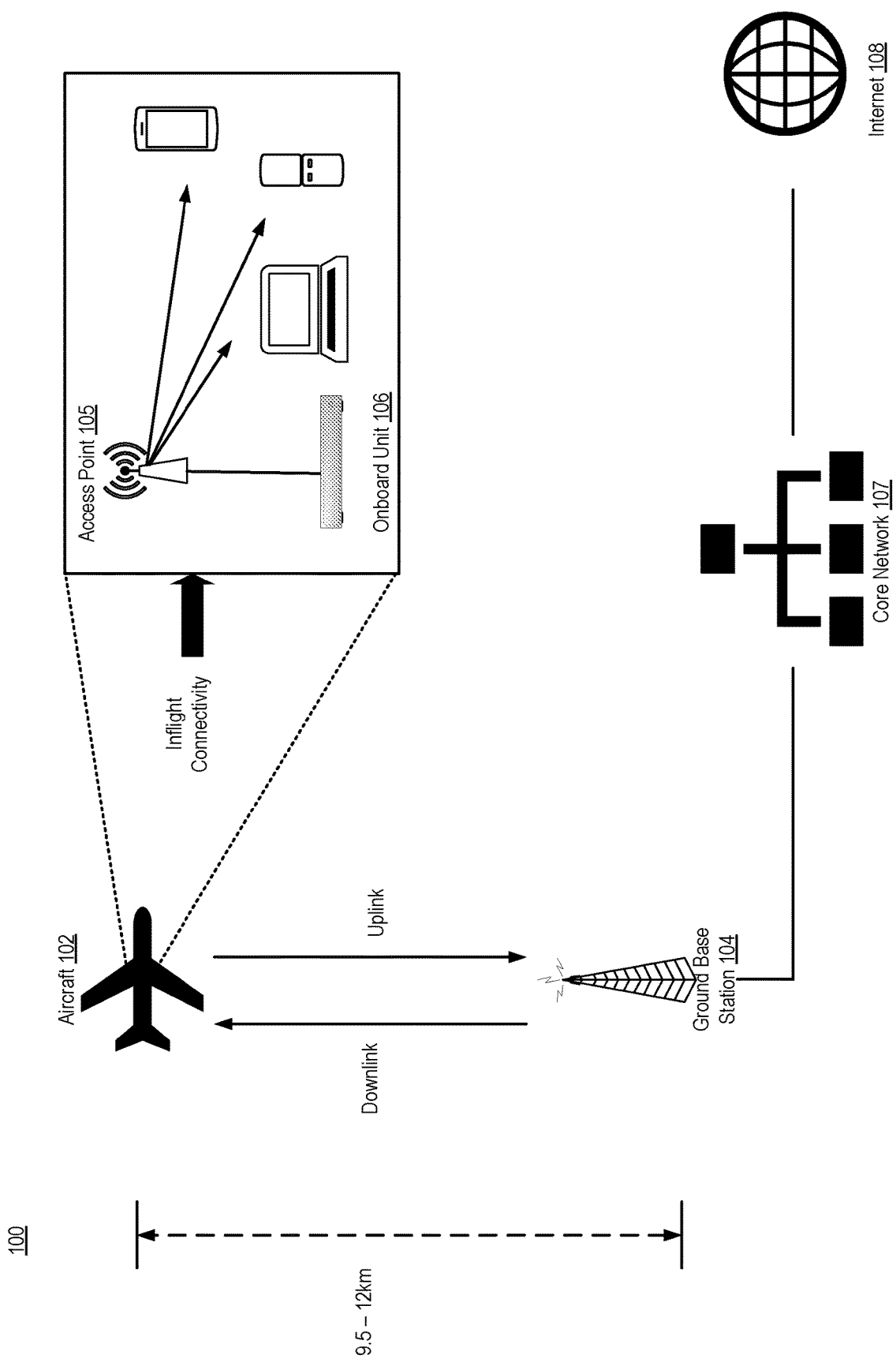
FIG. 1A illustrates a block diagram of an exemplary a cellular-based A2G communication system 100, in accordance with some embodiments.

The following description describes methods and apparatus for network design and optimization using deep learning. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

5G introduces significant complexity and challenges to network design and optimization. 5G provides a variety of deployment options. Initial Non-Standalone Architecture (NSA) for 5G NR deployment relies on 4G LTE for control signaling and Core support. Standalone Architecture (SA) for 5G NR deployment uses the new 5GC. 4G LTE and NR will coexist for many years to come, causing the need for joint network design and optimization of 4G and 5G while taking into account any legacy 2G and 3G networks as appropriate. The deployment may involve multiple layers consisting of macro cells and diverse types of small cells. In addition, the separation of CU (Centralized Unit) and DU (Distributed Unit) can be used to enable virtualized RAN or Cloud RAN deployment, introducing additional deployment complications.

5G provides wide range of frequency bands. 5G NR features spectrum flexibility and supports operation in the spectrum ranging from low band, mid-band to high band millimeter wave. Network design and optimization across the wide range of frequency bands to achieve the best performance of coverage, capacity, data rate, and latency is complex.

5G provides advanced antenna technologies. NR features a beam centric design to leverage advanced antenna technologies. The planning of beam patterns will impact network coverage, user throughput, mobility performance, among others. The number of supported broadcast beams may be up to 8 in sub-6 GHz and up to 64 in millimeter wave, resulting in escalated complexity in network design and optimization. User throughput is the amount of data being received by a connected user on average in a radio access network. For example, user throughput can be defined as the number of packets received by a specific user equipment (UE).

5G provides a highly flexible air interface. 5G NR, by design, is inherently flexible and provides a great level of configurability to support the diverse 5G use cases and their demanding network performance requirements. The flexibility, however, also makes finding the right optimized design parameters tailored to a given deployment scenario a challenging task.

To design, deploy and operate complex 5G networks, there is a need to increase efficiency, optimize performance and automate network management, for which machine learning (ML) and artificial intelligence (AI) can be used.

In the present embodiments, a framework for network design and optimization using deep learning is presented. The framework is described using air-to-ground (A2G) communications as a non-limiting example use case.

Mobile networks traditionally serve devices on the ground, but interest and business case for using mobile networks, including both existing LTE networks and emerging 5G networks, to provide connectivity for drones and aircraft in the sky is growing fast. In particular, providing broadband in-flight connectivity (IFC) via direct A2G communications is attracting significant attention.

Direct A2G communications use cellular technology for establishing direct connectivity between aircraft and ground base stations (BSs). The ground BSs can be dedicated to A2G communications and have similar functionality as cellular towers. However, compared to traditional cellular towers, dedicated A2G BSs use up-tilted antennas towards the sky and typically have larger inter-site distances (ISD) due to sparser traffic. The cellular-based direct A2G solutions offer several advantages over the satellite-based solutions such as larger system capacity and shorter latency for IFC. Cellular-based direct A2G networks are particularly suitable for short- and medium-haul continental flights as well as over-land long-haul flights.

It is expected that 5G NR will play a key role in A2G systems by providing improved performance and enhanced user experience for wide range of flight routes, applications, and aircraft types. In 3GPP Release 17, there is a work item on NR non-terrestrial networks (NTN), the objective of which includes design compatibility for supporting A2G communication systems.

Existing cellular networks have been primarily designed for serving users on the ground (in low altitudes). In particular, the network deployment and antenna design are typically optimized based on the performance requirements of terrestrial users. The traditional BSs use down-tilted antennas to serve terrestrial users whereas A2G BSs use up-tilted antennas to face the sky. A2G networks typically have larger inter-site distances (ISD) than the traditional networks due to sparsely dispersed traffic demand. Third, the high aircraft speed in A2G networks poses stringent requirements on mobility. Therefore, the system-level design insights inherited from traditional terrestrial cellular networks are not directly applicable to A2G networks. Specifically, providing broadband in-flight wireless connectivity is challenging without having a dedicated A2G communication system which is optimized for high-altitude connectivity in the sky. In addition, the problem of network optimization for A2G communications is a complex task which needs efficient solutions.

Some existing approaches exploit machine learning to approximate network design optimization algorithms. However, the network design optimization algorithms are only suitable for specific models. For example, in some existing approaches double deep neural networks (DNNs) have been used to approximate specific optimization algorithms suitable for a particular problem under consideration. In fact, the prior work on e.g., A2G networks has largely been limited to A2G performance evaluation under different scenarios. For example, a power allocation problem to maximize the signal-to-interference-plus-noise-ratio (SINR) was considered in a first existing approach, where the input and output of a resource allocation algorithm was treated as an unknown non-linear mapping and a fully-connected DNN was used to approximate it. In a second existing approach, a set of network features was identified via deep learning for a link scheduling problem. The final solution was obtained using branch and bound or dynamic programming methods. These methods are only suitable for specific models that rely on traditional optimization algorithms. Thus, while the problem of network design optimization has been studied, none of the existing approaches provide a generic framework to address multiple network optimization problems that are different.

The embodiments described herein provide a generic framework for network design and deployment optimization. The embodiments herein provide a framework that is more flexible in tuning different optimization parameters and that can address various network optimization problems. While the embodiments herein will be described with respect to some use cases, this should not be considered a limitation and other use cases can be contemplated without departing from the scope of the embodiments.

The proposed framework exploits tools from Artificial intelligence (AI) and deep learning for modeling complex 5G networks as well as solving the associated network optimization problems for determining design parameters. As an illustrative non-limiting example, the proposed framework is applied to efficient design and deployment of A2G networks that can meet broadband IFC requirements. The framework enables performance optimization of A2G communication systems by jointly optimizing various network deployment parameters such as antenna beam tilt, number of sectors, and ISD. The proposed framework supports various inputs such as information related to map/environment/deployment to approximate 5G network behavior and optimize its performance.

The embodiments described herein target multi-parameter optimization to jointly optimize several parameters at the same time. In addition, it is flexible to cope with networking problems in different scenarios with only simple modifications of the architecture rather than switching to totally different algorithms. In some embodiments described herein a neural network (NN) is used as a function optimizer.

The embodiments herein present methods for efficient design, deployment, and operation of communication systems. The proposed deep learning-based solutions allow to efficiently solve complex network planning optimization problems with many parameters. The embodiments are well suited for addressing the increasingly escalated complexity in network design and optimization associated with 5G networks and beyond.

FIG. 1A illustrates a block diagram of an exemplary a cellular-based A2G communication system 100, in accordance with some embodiments. The system 100 includes the following components: 1) access point (e.g., Wi-Fi) 105 that provides wireless connectivity to end users, 2) aircraft A2G network equipment 106 enabling communication with ground BSs, 3) a ground radio access network 104 for establishing direct A2G radio links to flying aircraft (e.g., aircraft 102), and 4) a core network 107 for communication with external packet data networks. In some embodiments, a UE corresponds to a flying platform such as an airplane. In some embodiments, a UE can be another electronic device that is different from an airplane, such as a drone, a mobile device, etc. The UE is operative to be coupled with a BS of the network.

The embodiments presented herein allow to optimally deploy a network and effectively adjust design parameters that lead to the best system performance, in terms of e.g., coverage and throughput. The proposed solutions are generic and broadly applicable to network design and optimization in different deployment scenarios. A dedicated A2G network that provides wireless connectivity to flying UEs (e.g., drones, aircraft, helicopters) in the sky is presented as an exemplary embodiment. The dedicated A2G network design is particularly important as a wide range of parameters need to be optimized, and hence is considered as a non-limiting example in this invention.

Figure 2:
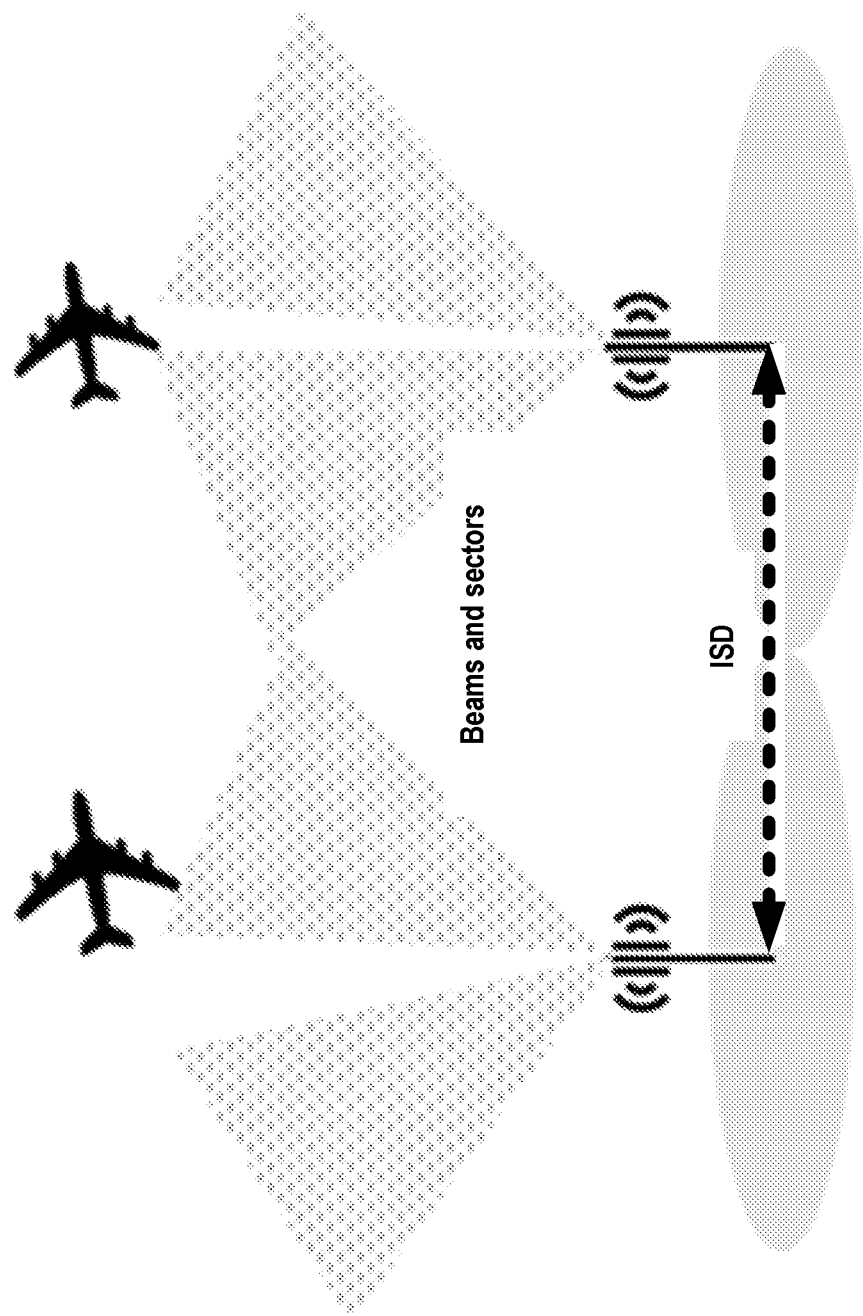
FIG. 2 illustrates exemplary parameters that can be optimized for network deployment in accordance with some embodiments.

For network deployment, various parameters can be optimized including inter-site distance (ISD), number of sectors per site, antenna configurations and pattern, and up-tilt angle (which can be set mechanically and/or electronically) of sector antennas (as illustrated in FIG. 2). Moreover, the network optimization can be adapted according to aircraft altitude, traffic load, antenna pattern, carrier frequency, and any other affecting factors.

Figure 3:
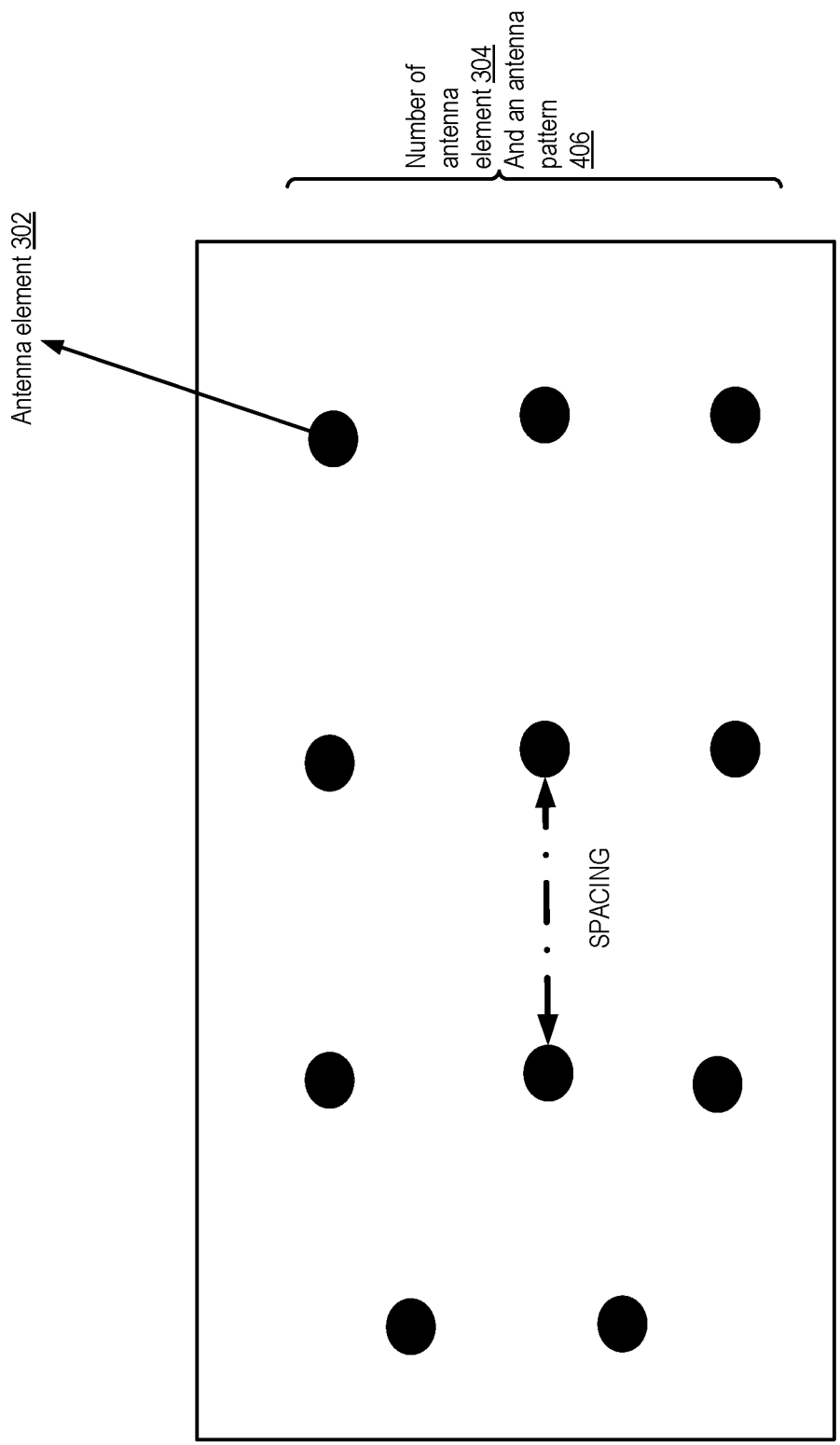
FIG. 3 illustrates exemplary parameters that can be optimized for network deployment in accordance with some embodiments.

Another example of network design consideration that can be addressed by the embodiments herein relates to antenna layout optimization in which antenna geometry and antenna element spacing are optimized to achieve the optimal system performance. For instance, one can optimize the antenna layout for a 2D antenna array (which can be uniform or non-uniform) by optimizing the antenna element spacing as well as the antenna array geometry (see FIG. 3). The antenna array layout controls the number of beams, beamwidth, and beam directions. In this case, for a given number of antenna elements, the design problem is to find the optimal arrangement of the antenna elements that results in the best performance in terms of e.g., coverage and throughput. The antenna layout optimization can be done at the BS side and/or UE side.

Figure 1B:
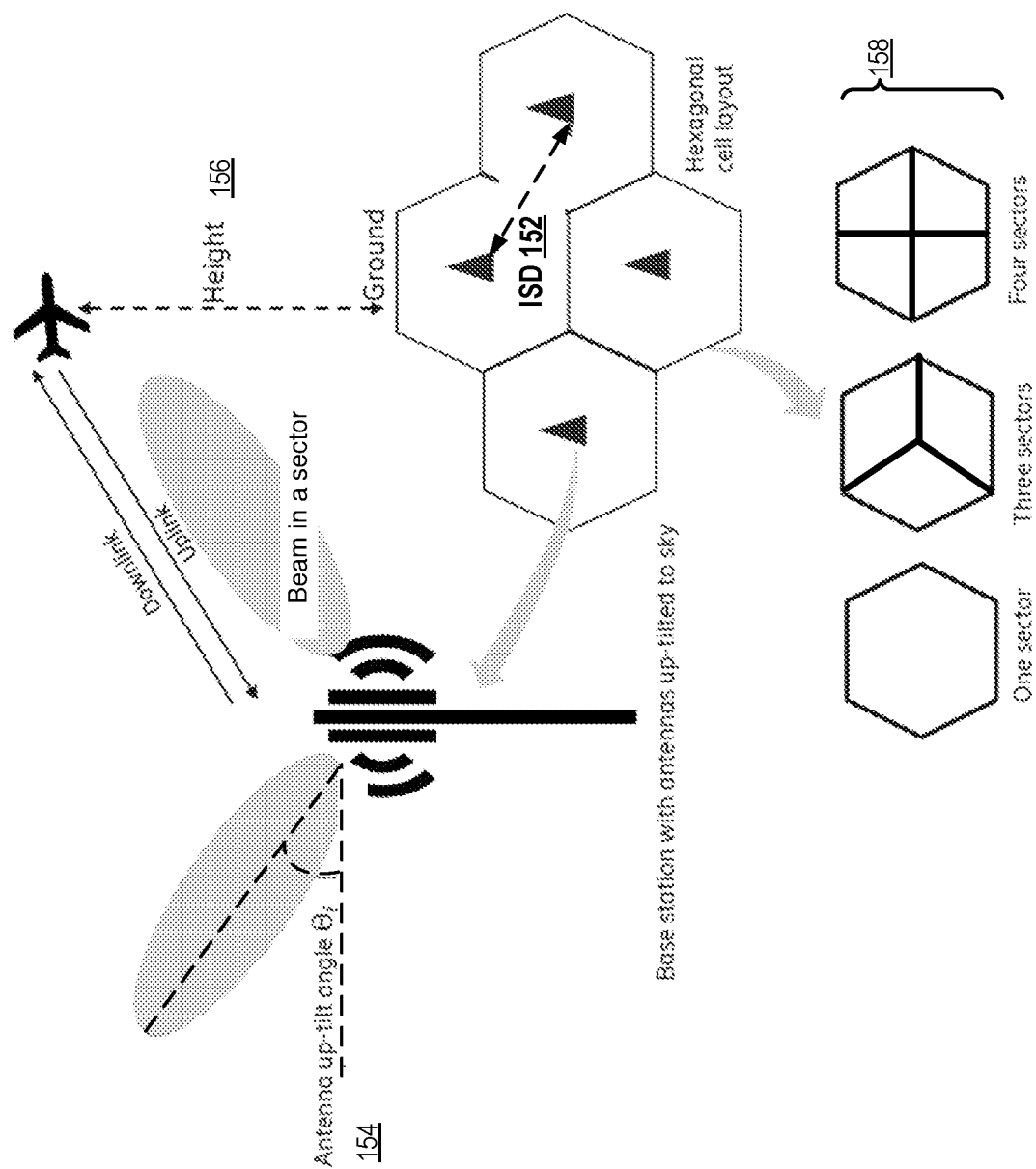
FIG. 1B illustrates a block diagram of an exemplary A2G network in accordance with some embodiments.

FIG. 1B illustrates a block diagram of an exemplary A2G network in accordance with some embodiments. The A2G network 150 includes a hexagonal tessellation of terrestrial BSs that serve multiple airborne aircraft within a two-dimensional plane at a certain altitude from the ground. In this exemplary A2G network, the BSs are identical and each BS has S sectors where the antenna for a sector is up-tilted with a respective antenna up-tilt angle. The antenna up-tilt angle can be in a range between zero degrees and nighty degrees. In some embodiments, when the up-tilt angle of the antenna is at 90 degrees, this is an indication that the antenna is pointed upward. The sectors are otherwise identical in terms of the antenna beam pattern and transmit power. The horizontal (azimuthal) plane is split uniformly among the sectors (see FIG. 1B). At a given BS, the up-tilt angle for each sector can be set independently. Given the symmetrical tessellation, we the same up-tilt angle configuration can apply to all B Ss. FIG. 1B shows three examples for the number of sectors per site, namely one sector, three sectors, or four sectors. In some embodiments, the 3GPP rural macrocell spatial channel model specialized to line-of-sight propagation conditions is considered. In some embodiments, full frequency reuse is enabled such that the received DL signal at an aircraft is subjected to thermal noise as well as inter-cell interference. The embodiments described herein allow to find the A2G network deployment configuration in terms of the ISD and up-tilt angles that maximizes the user throughput under the described set of system parameters. The user throughput is a random quantity that depends on the SINR which itself is a function of various factors such as antenna configuration, channel gain, user distribution, network geometry and traffic load. Finding the A2G network deployment configuration that maximizes the user throughput is an optimization problem. The o objective function of the optimization problem depends on a myriad of interdependent underlying factors which further compounds the problem. In practical scenarios, finding a tractable expression for the considered objective function is usually infeasible. Consequently, one has to resort to exhaustive system-level simulations which require time and compute resources. The embodiments herein provide an efficient technique for modeling and solving the considered optimization problem for A2G networks.

The embodiments described herein provide a novel framework that addresses the problem of 5G network optimization with various interdependent parameters. The framework is based on deep learning. Specifically, a double deep neural network (DNN) architecture consisting of two connected DNNs is designed. The double-DNN architecture consists of two DNNs to model the network behavior and solve network optimization problems involving numerous parameters. The first DNN is operative to approximate the complex behavior of the communication network and find the relation between input parameters and output metrics. The input parameters include design parameters which need to be optimized, and the outputs represent the performance evaluation metrics such as coverage and throughput. The second DNN is operative to act as a function optimizer that maximizes the performance by finding the optimal values for the network parameters.

Figure 4:
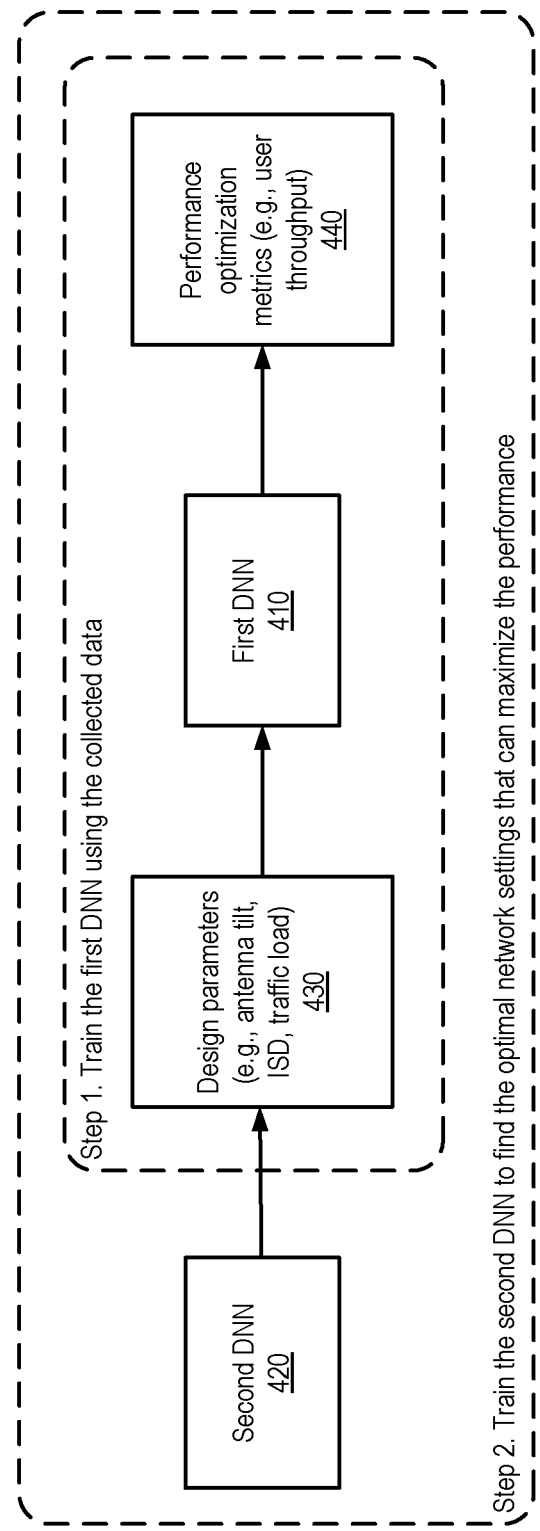
FIG. 4 illustrates an exemplary double DNN architecture in accordance with some embodiments.

FIG. 4 illustrates an exemplary double DNN architecture in accordance with some embodiments. The framework involves 1) data collection for developing a machine learning model, 2) building and training the model for both DNNs, 3) deploying the model, and 4) updating the model.

Data Collection:

Different types of data is collected to develop the machine learning model. The types of data may include SNIR (Signal-to-Interference-plus-Noise Ratio), SIR (Signal-to-Interference Ratio), and/or SNR (Signal-to-Noise Ratio) values, and user throughput within a desired 3D space. Moreover, the data collection can be done for various network layouts and configurations such as BS locations, BS antennas patterns, number of sectors, antenna tilt angle, traffic load, and UE attitude (or 3D position). The data can be obtained by one or more of the following methods or a combination of these methods: 1) Link- and/or system-level computer simulations of the A2G network; 2) Actual data obtained from an A2G network; 3) Existing data can also be utilized. New data can be collected to be integrated with existing data to enhance the quality and accuracy of the data.

In one embodiment, the base station (e.g., next generation Node B (gNB) in a 5G network) configures one or more UEs to measure and report SNR/SIR/SINR and user throughput along with the 3D location of the UEs. In another embodiment, the base station configures one or more UEs to measure and report SNR/SIR/SINR/RSRP and user throughput, and the base station estimates the UE's 3D position corresponding to the reported measurements. In another embodiment, the network deploys one or more UEs dedicated to data collection. These UEs measure SNR/SIR/SINR/RSRP, user throughput and their 3D positions periodically. The UEs may store the data locally which is fetched at a later time at the end of their deployment. Alternatively, the UEs transmit the data to the network during the deployment.

First DNN for Characterizing Network Behavior

The first DNN is trained and is operative to characterize the behavior of the network and provide a function that can approximate the relationship between design parameters (input) and performance metrics (output). For example, the first DNN approximates the $X^{th}$-percentile user throughput for a given set of input parameters. The relationship between the input and output parameters is represented by a function that maps the inputs to the outputs. FIG. 5 illustrates an exemplary DNN for approximating the input-output relationship in accordance with some embodiments. In some embodiments, the first DNN replaces an actual system-level simulator to save time and compute resources. The use of the first DNN allows to expedite the training process of the second DNN by replacing the cumbersome system-level simulator by using another DNN to imitate an actual simulator. In some embodiments, the input parameters can include various network deployment parameters such as ISD, antenna tilt angle, and traffic load. In some embodiments, other parameters such as the number of BSs and the number of sectors per site can be fixed. In some embodiments, the input parameters can include one or more additional parameters such as UE altitude, number of BSs, and number of sectors per site. In some embodiments, the antenna tilt angle is the mechanical tilt of the antenna, i.e., the angle of the antenna boresight direction at the time of deployment. The beam generated by the antennas can be steered in different directions electronically. The electrical tilt can be updated frequently. In some embodiments, the mechanical tilt of the antenna hardware is updated on a long-term basis. In some embodiments, traffic load is a target traffic load chosen by a network designer. For example, a conservative approach may target the peak traffic during daytime and then optimize the parameters accordingly. The output is the performance optimization metrics which can be SINR/SNR/SIR/RSRP, user throughput, and any other desired metrics.

In one embodiment, a first DNN is operative to determine a representation of a relationship between network deployment design parameters, economic factors and performance optimization and cost efficiency metrics. In other words, the first DNN can incorporate both technical and economic design parameters and outputs. In some embodiments, the inputs to the first DNN can be one or multiple of the following parameters: ISD, antenna tilt angle, number of sectors, UE altitude, carrier frequency, number of antenna elements, antenna pattern, configuration on the BS and/or UE side, traffic load, investment and operational costs. In some embodiments, the outputs of the first DNN can be one or multiple of the following metrics: SINR, SNR, SIR, RSRP, user throughput, a measure of resource utilization, a measure of resilience of the radio access network, a measure of energy efficiency for the radio access network, and a measure of cost efficiency for the radio access network.

Figure 5A:
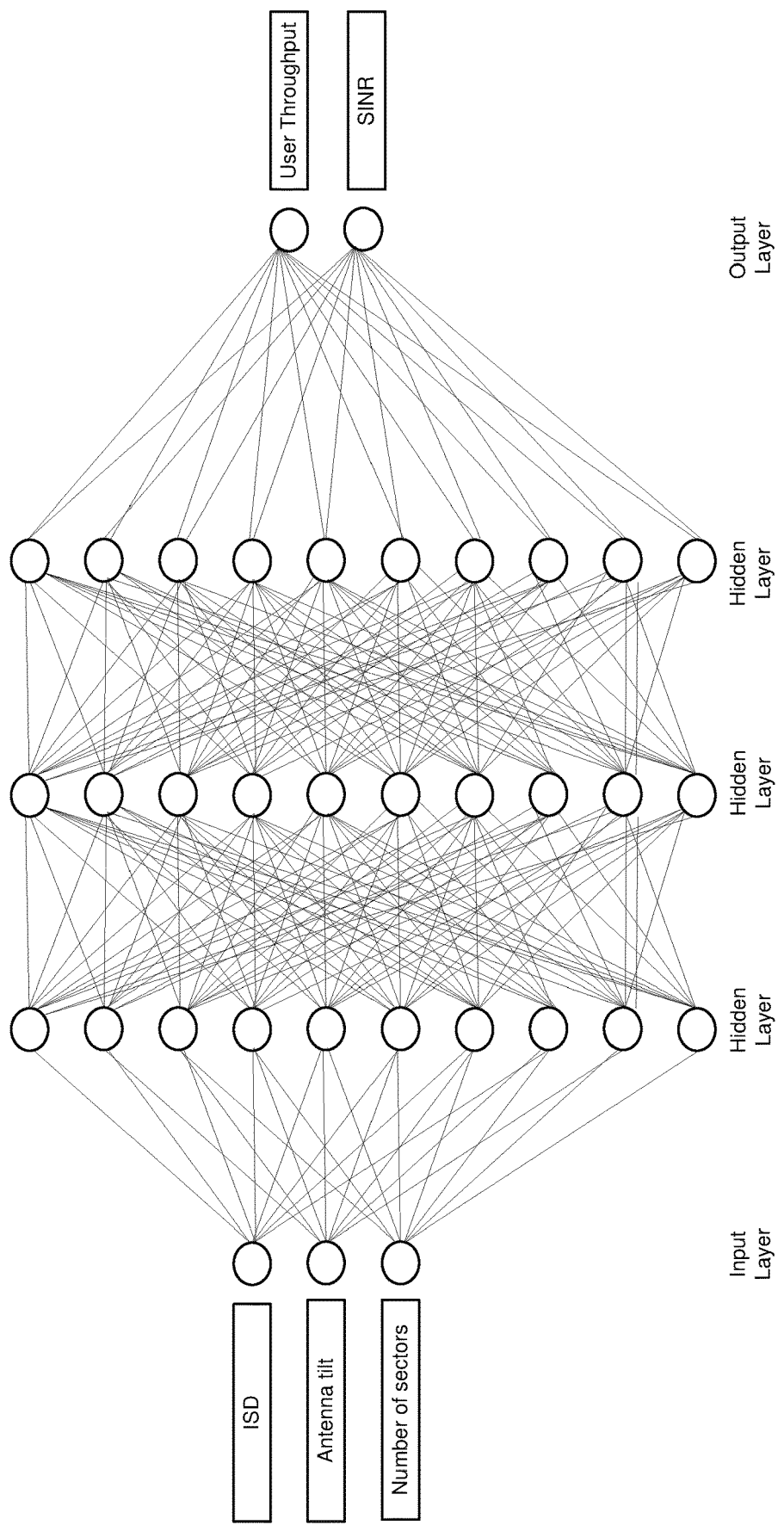
FIG. 5A illustrates an exemplary DNN for approximating the input-output relationship in accordance with some embodiments.
Figure 5B:
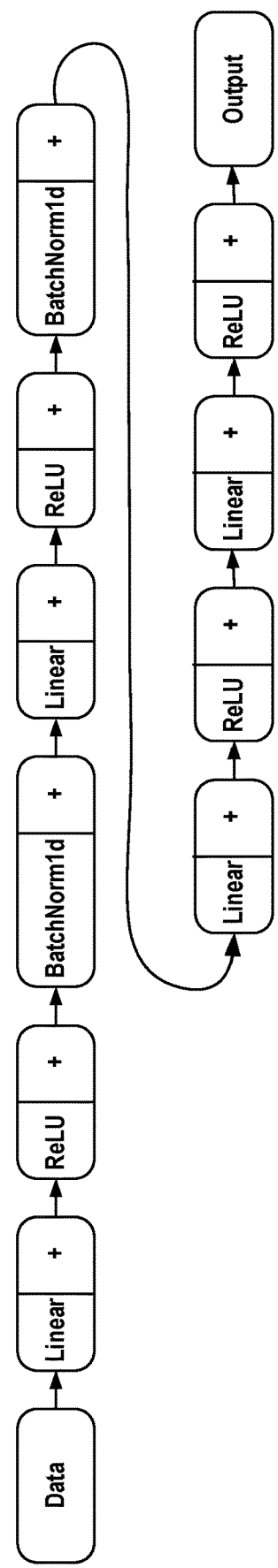
FIG. 5B illustrates an exemplary detailed architecture of the first DNN, in accordance with some embodiments.

As illustrated in FIG. 5A, the first DNN includes three fully connected hidden layers. FIG. 5B illustrates an exemplary detailed architecture of the first DNN, in accordance with some embodiments. In these embodiments, the first DNN includes a rectified linear unit (ReLU) as the activation function for each of the hidden layers. In one exemplary embodiment, the first DNN is trained with the mean squared error (MSE) based on the throughput outputs of second DNN, a 5G NR system-level simulator as the loss function, and Adam as the optimization algorithm. The data input to the first DNN is the output of the second DNN.

The embodiments herein also support various inputs and multi-objectives based on the available data. For example, related to economic aspects, one direct way for modeling the cost is to capture it in a multi-objective optimization form, along with other objectives (e.g., throughput, coverage). Meanwhile the deployment cost can be indirectly minimized by minimizing various parameters such as the number of base stations (which is related to the ISD), number of antennas, and transmit power.

The network deployment optimization provides cost reduction. Specifically, with an optimal design setting, a fewer number of base stations need to be deployed to meet performance requirements. Moreover, an optimal design can improve the resource and computational efficiency as well as network/user energy efficiency. This, in turn, can reduce the deployment and operating expenses.

Second DNN for Network Design Optimization

The second DNN is operative to find the optimal values of design parameters that lead to the maximum system performance. The second DNN acts as an optimizer for the function obtained using the first DNN. A high-level structure of the double-DNN approach for network design and optimization is illustrated in FIG. 4.

The second DNN is designed for solving the network deployment optimization problem leveraging the results obtained by the first DNN. It outputs the optimal values for the deployment parameters which are also fed as an input to the first DNN. In one embodiment, the second DNN is trained to optimize the network parameters to achieve the best or desired system performance. In some embodiments, the second DNN can optimize one or multiple of the following parameters: ISD, antenna tilt angles, BS locations, number of sectors, information about map/environment, number of antenna elements, and antenna configurations. In some embodiments, proper constraints on the feasible range of different parameters are considered for performance optimization. In some embodiments, the second DNN can consider one or multiple of the following metrics as the objective functions: SINR, SNR, SIR, RSRP, and user throughput in downlink and/or uplink.

The second DNN is trained to minimize a loss function. When the throughput is used as the performance metric, the loss function equals to the negative of the average throughput of a batch of candidate deployment configurations. Consequently, minimizing the considered loss function during the training process maximizes the average throughput in the batch. While the embodiments herein are described with respect to the loss function related to the throughput, additionally or alternatively, the loss function can be based on one or more other performance metrics such as SINR, SNR, SIR, RSRP, etc.

In some embodiments, the second DNN includes a word embedding algorithm. A word embedding algorithm maps the words in a word set to numerical vectors that represent the word features. In the embodiments described herein a batch of n candidate deployment configurations is the word set to be embedded, i.e., the embedding vector for the $i^{th}$ word contains the features $[d_i; \theta_i; l_i]$, where $d_i; \theta_i; l_i$ represent the design parameters to be optimized, $d_i$ being the distance between sites (ISD), $\theta_i$ being the up-tilt angle of the antenna, and $l_i$ being the downlink (DL) higher layer traffic load. Thus, finding the optimal embedding vectors for the deployment configurations leads to ISD and up-tilt angles that are optimized for throughput.

Figure 5C:
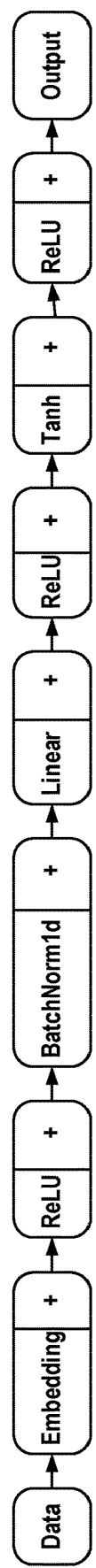
FIG. 5C illustrates a block diagram of an exemplary implementation of the second DNN, according to some embodiments.

In some embodiments, the training process of the second DNN is based on a modified version of a word to vector (word2vec) algorithm. FIG. 5C illustrates a block diagram of an exemplary implementation of the second DNN, according to some embodiments. In one embodiment, a Tanh layer is added before ReLU to normalize the output range from the network to $[-1,1]$ so that after ReLU, the output is restricted to $[0,1]$. This enables proper processing of the outputs which further serve as inputs for the first DNN. After the convergence of the second DNN, the output from the second DNN includes a batch of well-tuned network deployment configurations, among which the optimal configuration of a network deployment that maximizes the user throughput is selected.

In some embodiments, the modified version of the word2vec algorithm can be implemented as follows. A set of n candidate network deployment configurations is treated as a word set. The second DNN takes the set of indices of the set of n candidate network deployment configurations as an input, and outputs a matrix D containing vectors representing each deployment configuration. Each row of the matrix D is a deployment configuration (e.g., defined by a respective ISD, a respective tilt-up angle, and a respective traffic load). In some embodiments, when the performance metric is the user throughput, the second DNN is trained by defining its loss function as the negative of an average of the approximated user throughput taken over the batch of candidate network deployment configurations. In some embodiments, the Adam optimizer is used for minimizing the loss function. In one embodiment, the weights of the second DNN and the matrix D are initialized with random values and multiple iterations per epoch are run. The mean error for the loss function is computed. The batch D' with the minimum error is stored for every epoch and the batch D* with the minimum error across all the epochs is retained. The second DNN converges when the minimum error remains unchanged for more than $k_{max}$ iterations. Finally, the throughput-optimal parameter values are obtained using. The execution of the second DNN has a linear time complexity, which makes it efficient.

The second DNN outputs a subset of candidate network deployment configurations from the candidate network deployment configurations. From the output set of network deployment configurations, the network deployment configuration that provides the maximum user throughput is selected for deployment of a network. The network deployment configuration is defined based on the design parameters, e.g., ISD parameter value, up-tilt angle of the antennas value, and DL higher layer traffic load value. In some embodiments, additional configuration parameters are used.

Deployment, Use, and Update of the Deep Learning Model

Once the double DNN model is built, the next step is to deploy and use the model in networks. In one embodiment, the model is deployed and executed at a central entity, which could be a network node or a device in the cloud. While the model is deployed and used in the network, the model can be updated by adapting to any changes in the environment/scenario and incorporating new data. The model update can be performed periodically or in an event-triggered manner. In one embodiment, the network updates the tunable parameters periodically or in an event-triggered manner. The network may implement this decision at various levels such as site-specific or specific to a group of sites.

The network may decide whether or when to apply (e.g., trust) one or more parameters obtained from the DNN. For example, this decision can be made based on the received signal strength or SINR on the UL and/or the feedback received from the UEs such as measurement reports. It can also be inferred from other performance statistics at the physical or higher layers, such as block error rate, call drop rate, etc. Moreover, it can also be based on the interference statistics e.g., if there is increased interference to/from other transmitters/receivers in the same and/or other network, the network may decide not to apply the setting output by the DNN.

Figure 5D:
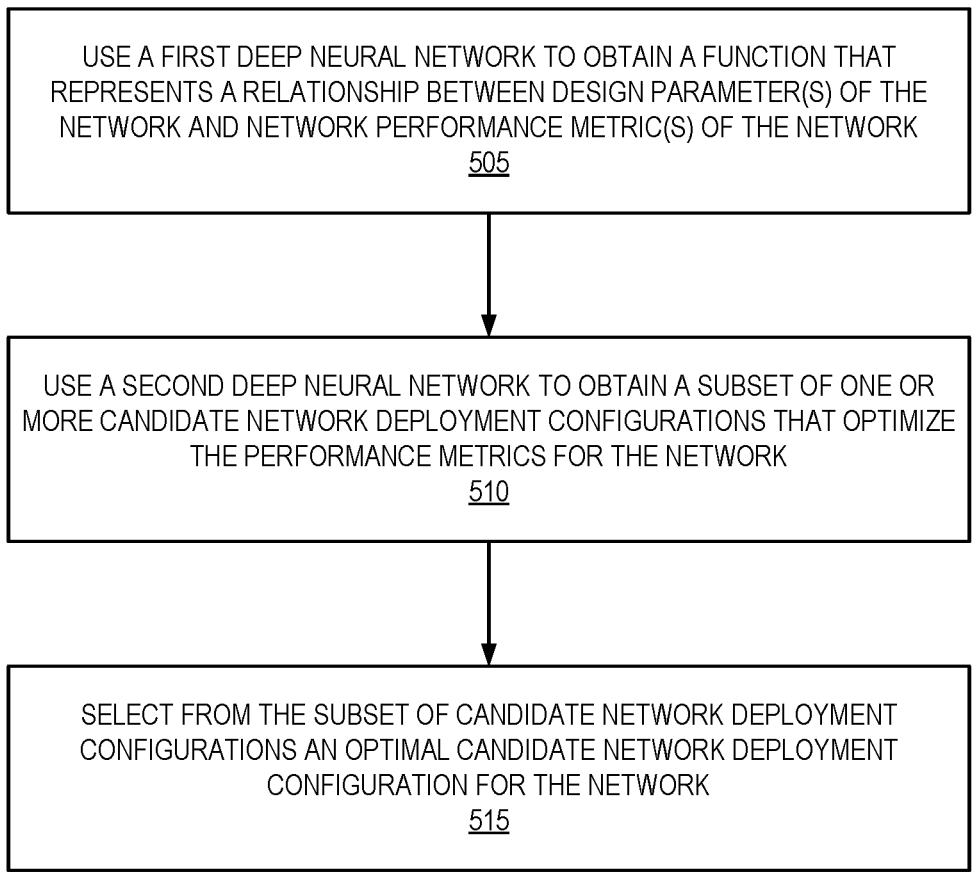
FIG. 5D illustrates a flow diagram of exemplary operations that can be performed for design and deployment of a network, in accordance with some embodiments.

FIG. 5D illustrates a flow diagram of exemplary operations that can be performed for design and deployment of a network, in accordance with some embodiments. In some embodiments, the network is a radio access network. At block 505, the system a first deep neural network to obtain a function that represents a relationship between design parameters of the network and network performance metrics of the network. In some embodiments, the design parameters include one or a combination of an inter site distance (ISD) between base stations of the radio access network, an antenna tilt angle of antennas in the radio access network, and a traffic load. In some embodiments, the design parameters further include one or a combination of a user equipment (UE) altitude, a number of antenna sectors, carrier frequency, a number of antenna elements, an antenna pattern, a configuration parameter of a base station of the radio access network, a configuration parameter of the UE, investment costs, and operational costs. In some embodiments, the network performance metrics include one or a combination of signal to noise plus interference ratio (SNIR), signal-to-interference-ratio (SIR), and signal-to-noise ratio (SNR), and reference signal received power (RSRP), and user throughput, a measure of resource utilization, a measure of resilience of the radio access network, a measure of energy efficiency for the radio access network, and a measure of cost efficiency for the radio access network.

At operation 510, the system uses a second deep neural network to obtain a subset of one or more candidate network deployment configurations that optimize the performance metrics for the network. A candidate from the candidates of network deployment configurations is defined based on respective design parameters. In some embodiments, a loss function of the second deep neural network is the negative of an average of an approximated user throughput taken over a set of one or more candidate network deployment configurations that include the subset of candidate network deployment configurations.

The flow moves to operation 515. At operation 515, the system selects from the subset of candidate network deployment configurations an optimal candidate network deployment configuration for the network. The optimal candidate network deployment configuration maximizes performance of the network as defined based on the performance metrics. For example, the optimal candidate network deployment maximizes throughput.

The embodiments described herein present a machine learning-based solution for efficient network design and optimization for complex networks such as 5G networks and beyond. In particular, the proposed solutions exploit tools from deep learning and deep neural networks, to characterize the network behavior and optimize its performance by adapting suitable design parameters.

The embodiments described herein present a double DNN architecture for enabling optimization of network design. A first DNN is used to approximate the network behavior and a second DNN is used as a function optimizer that builds on the first DNN to yield optimal network design parameters. The proposed solutions are applicable to both A2G and terrestrial communications.

The embodiments described herein provide a new deep learning-based framework for A2G network design and deployment optimization. Specifically, the proposed framework includes a bi-DNN architecture for modeling and optimizing A2G networks that involve a wide range of parameters. In the proposed framework, the first DNN helps approximate the aircraft throughput and the second DNN determines the throughput-optimal network design parameters. In some embodiments, the network design parameters include the antenna up-tilt angles and the ISD. In some embodiments, the framework allows to obtain relationships between throughput and design parameters. For example, throughput is optimized when the antennas are tilted up aggressively and the ISD is small. With a large ISD, the network gets coverage limited and the antennas need to be slanted to provide coverage throughout the cell. Moreover, under a low traffic load, it is throughput-optimal to deploy a large number of sectors. Under a high traffic load, the network becomes interference-limited and operating with fewer sectors is beneficial as it reduces interference.

Architecture

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The first DNN and the second DNN can be implemented on one or more network devices. In some embodiments, the first DNN or the second DNN can be implemented on one or more network devices of the network for which design is to be optimized. In other embodiments, the first DNN and/or the second DNN can be implemented on one or more network devices that are not part of the network.

Figure 6A:
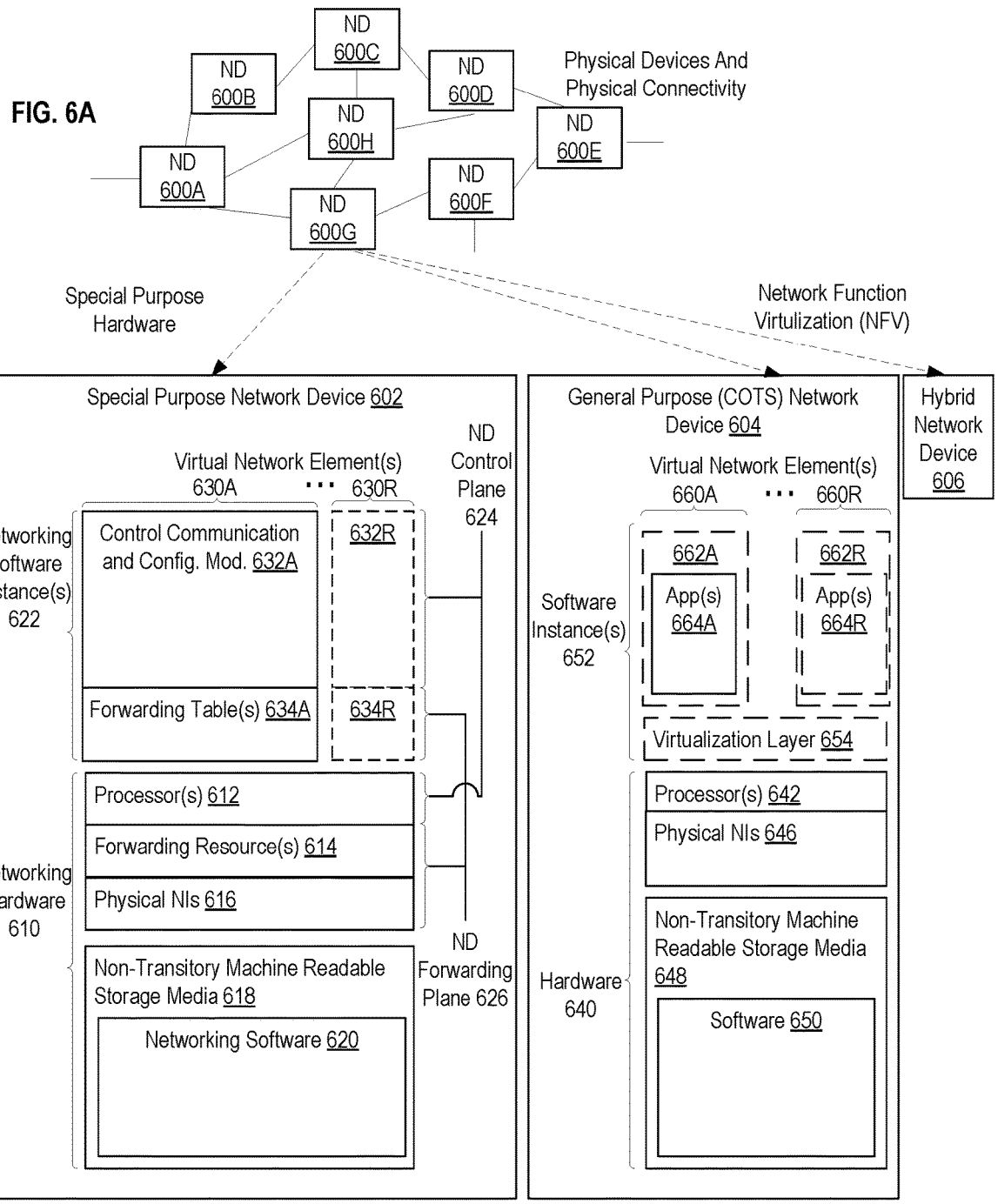
FIG. 6A illustrates connectivity between network devices (NDs) within an exemplary network, as well as three exemplary implementations of the NDs, according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between 600A-600B, 600B-600C, 600C-600D, 600D-600E, 600E-600F, 600F-600G, and 600A-600G, as well as between 600H and each of 600A, 600C, 600D, and 600G. These NDs are physical devices, and the connectivity between these NDs can be wireless or wired (often referred to as a link). An additional line extending from NDs 600A, 600E, and 600F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application—specific integrated—circuits (ASICs) and a special-purpose operating system (OS); and 2) a general purpose network device 604 that uses common off-the-shelf (COTS) processors and a standard OS.

The special-purpose network device 602 includes networking hardware 610 comprising a set of one or more processor(s) 612, forwarding resource(s) 614 (which typically include one or more ASICs and/or network processors), and physical network interfaces (NIs) 616 (through which network connections are made, such as those shown by the connectivity between NDs 600A-H), as well as non-transitory machine readable storage media 618 having stored therein networking software 620. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

The special-purpose network device 602 is often physically and/or logically considered to include: 1) a ND control plane 624 (sometimes referred to as a control plane) comprising the processor(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the processor(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

Figure 6B:
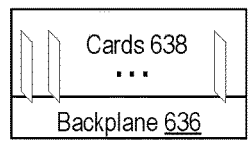
FIG. 6B illustrates an exemplary way to implement a special-purpose network device according to some embodiments of the invention.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general-purpose network device 604 includes hardware 640 comprising a set of one or more processor(s) 642 (which are often COTS processors) and physical NIs 646, as well as non-transitory machine-readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization. For example, in one such alternative embodiment the virtualization layer 654 represents the kernel of an operating system (or a shim executing on a base operating system) that allows for the creation of multiple instances 662A-R called software containers that may each be used to execute one (or more) of the sets of applications 664A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 654 represents a hypervisor (sometimes referred to as a virtual machine monitor (VMM)) or a hypervisor executing on top of a host operating system, and each of the sets of applications 664A-R is run on top of a guest operating system within an instance 662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels and sets of applications that are run in different software containers).

The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual network element(s) 660A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high-volume server hardware, physical switches, and physical storage, which could be located in Data centers, NDs, and customer premise equipment (CPE). While embodiments of the invention are illustrated with each instance 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 662A-R to VNEs also apply to embodiments where such a finer level of granularity and/or unikernels are used.

In certain embodiments, the virtualization layer 654 includes a virtual switch that provides similar forwarding services as a physical Ethernet switch. Specifically, this virtual switch forwards traffic between instances 662A-R and the physical NI(s) 646, as well as optionally between the instances 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 6C:
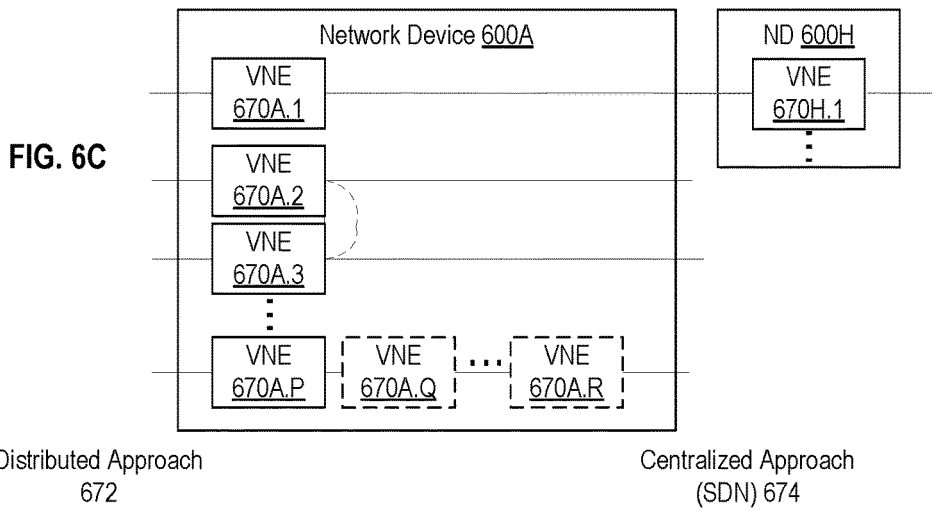
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software instances 662A-R may operate as servers; the same would be true for the hybrid network device 606; in the case of the special-purpose network device 602, one or more such servers could also be run on a virtualization layer executed by the processor(s) 612); in which case the servers are said to be co-located with the VNEs of that ND.

Figure 6D:
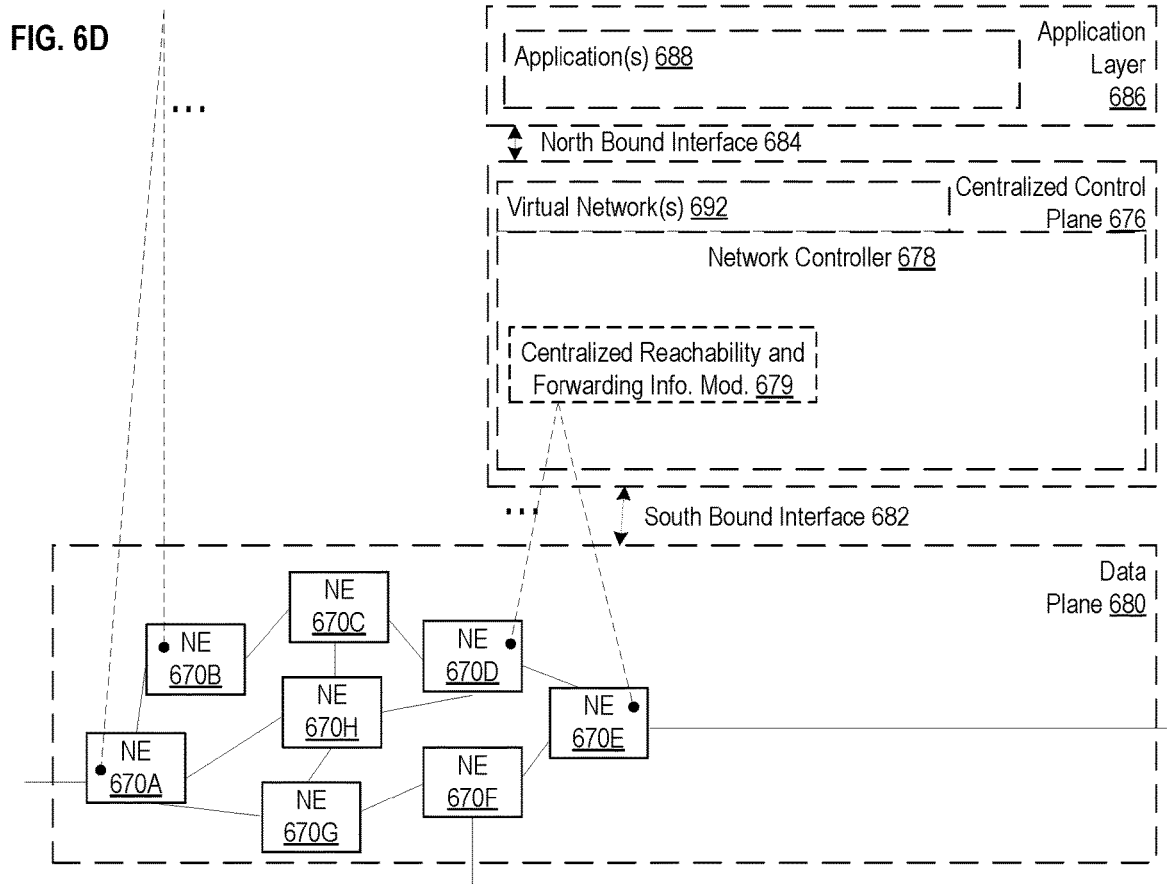
FIG. 6D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 670A-H (e.g., the processor(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general-purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the processor(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
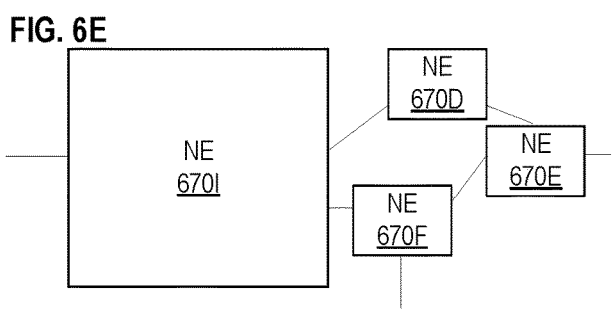
FIG. 6E illustrates the simple case of where each of the NDs implements a single NE, but a centralized control plane has abstracted multiple of the NEs in different NDs into (to represent) a single NE in one of the virtual network(s), according to some embodiments of the invention.
Figure 6F:
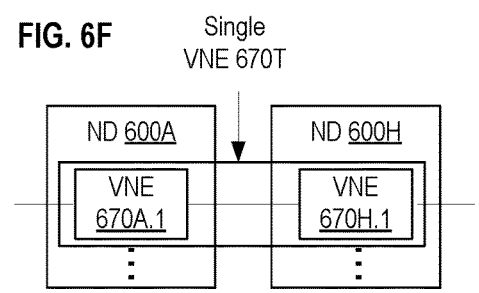
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
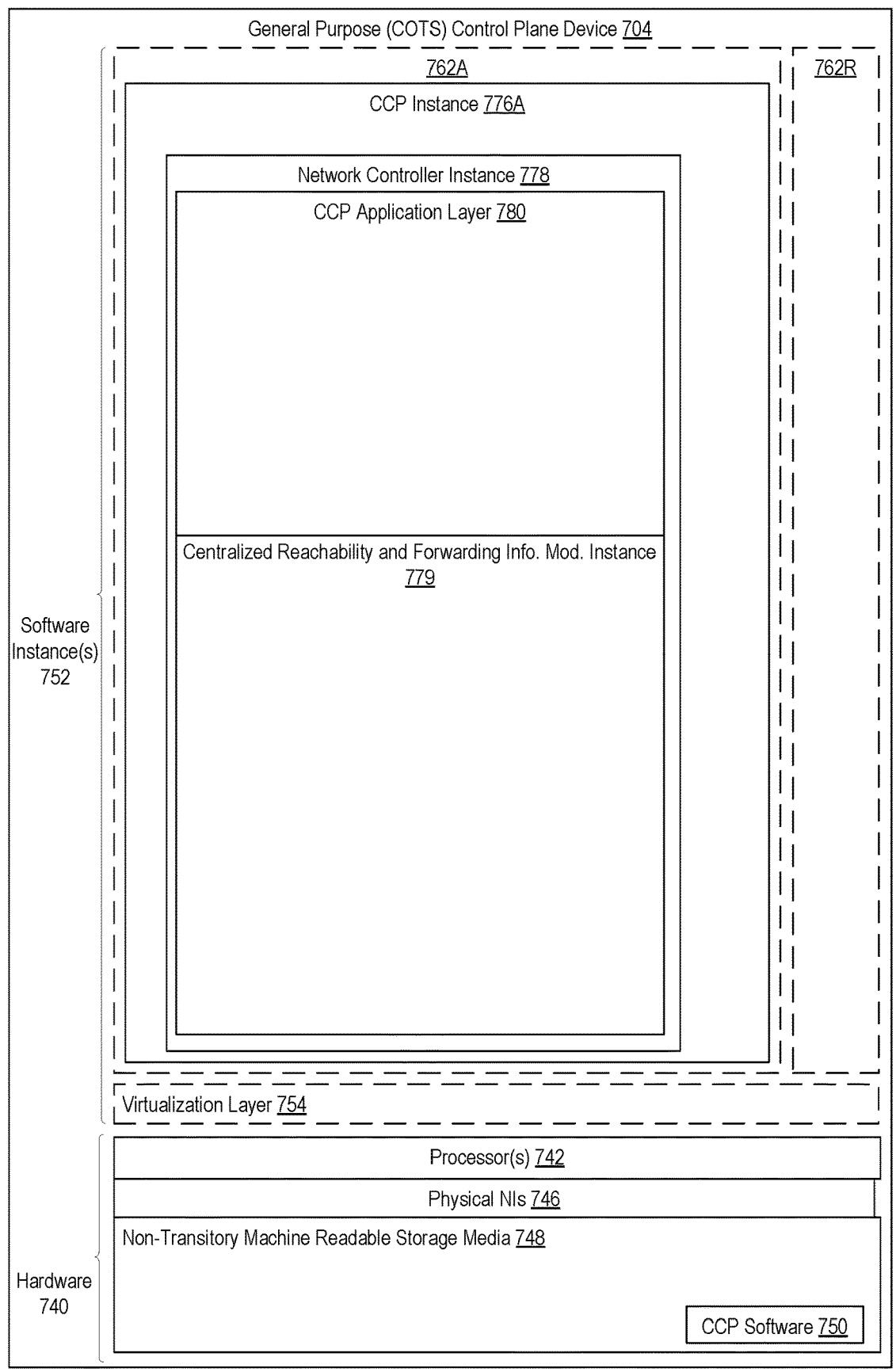
FIG. 7 illustrates a general-purpose control plane device with centralized control plane (CCP) software 750), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and physical NIs 746, as well as non-transitory machine readable storage media 748 having stored therein centralized control plane (CCP) software 750.

In embodiments that use compute virtualization, the processor(s) 742 typically execute software to instantiate a virtualization layer 754 (e.g., in one embodiment the virtualization layer 754 represents the kernel of an operating system (or a shim executing on a base operating system) that allows for the creation of multiple instances 762A-R called software containers (representing separate user spaces and also called virtualization engines, virtual private servers, or jails) that may each be used to execute a set of one or more applications; in another embodiment the virtualization layer 754 represents a hypervisor (sometimes referred to as a virtual machine monitor (VMM)) or a hypervisor executing on top of a host operating system, and an application is run on top of a guest operating system within an instance 762A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 740, directly on a hypervisor represented by virtualization layer 754 (in which case the unikernel is sometimes described as running within a LibOS virtual machine), or in a software container represented by one of instances 762A-R). Again, in embodiments where compute virtualization is used, during operation an instance of the CCP software 750 (illustrated as CCP instance 776A) is executed (e.g., within the instance 762A) on the virtualization layer 754. In embodiments where compute virtualization is not used, the CCP instance 776A is executed, as a unikernel or on top of a host operating system, on the "bare metal" general purpose control plane device 704. The instantiation of the CCP instance 776A, as well as the virtualization layer 754 and instances 762A-R if implemented, are collectively referred to as software instance(s) 752.

In some embodiments, the CCP instance 776A includes a network controller instance 778. The network controller instance 778 includes a centralized reachability and forwarding information module instance 779 (which is a middleware layer providing the context of the network controller 678 to the operating system and communicating with the various NEs), and an CCP application layer 780 (sometimes referred to as an application layer) over the middleware layer (providing the intelligence required for various network operations such as protocols, network situational awareness, and user—interfaces). At a more abstract level, this CCP application layer 780 within the centralized control plane 676 works with virtual network view(s) (logical view(s) of the network) and the middleware layer provides the conversion from the virtual networks to the physical view.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes, where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Attached is Exhibit A, the content of which is hereby incorporated herein by reference in its entirety, that described some embodiments of network design and optimization using deep learning.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of design and optimization of a wireless network, the method comprising:
    using a first deep neural network to obtain a function that represents a relationship between one or more design parameters of the wireless network and one or more network performance metrics of the wireless network;
    using a second deep neural network to obtain a first set of one or more candidate network deployment configurations that optimize the one or more network performance metrics for the wireless network, wherein each candidate from the first set of one or more candidate network deployment configurations is defined based on respective values of the one or more design parameters, wherein the second deep neural network is trained to minimize a loss function for the one or more network performance metrics, in which the one or more network performance metrics is a user throughput representing an average amount of data received by a connected user, and wherein the loss function of the second deep neural network equals an inverse of an average of the user throughput taken over a second set of one or more candidate network deployment configurations that includes the first set of one or more candidate network deployment configurations; and
    selecting from the first set of one or more candidate network deployment configurations an optimal candidate network deployment configuration providing a maximal performance of the wireless network as defined based on the one or more network performance metrics.

2. The method of claim 1, wherein the wireless network is a radio access network.

3. The method of claim 2, wherein the one or more design parameters include one or a combination of an inter site distance between base stations of the radio access network, an antenna tilt angle of antennas in the radio access network, and a traffic load.

4. The method of claim 2, wherein the one or more design parameters further include one or a combination of an altitude of a user equipment, a number of antenna sectors, carrier frequency, a number of antenna elements, an antenna pattern, a configuration parameter of a base station of the radio access network, a configuration parameter of the user equipment, investment costs, and operational costs.

5. The method of claim 2 wherein the one or more network performance metrics includes one or a combination of signal to noise plus interference ratio, signal-to-interference-ratio, and signal-to-noise ratio, and reference signal received power, and user throughput, a measure of resource utilization, a measure of resilience of the radio access network, an measure of energy efficiency for the radio access network, and a measure of cost efficiency for the radio access network.

6. A non-transitory machine-readable storage medium comprising instructions which, when executed by a computer, performs operations for design and optimization of a wireless network comprising:
    using a first deep neural network to obtain a function that represents a relationship between one or more design parameters of the wireless network and one or more network performance metrics of the wireless network;
    using a second deep neural network to obtain a first set of one or more candidate network deployment configurations that optimize the one or more network performance metrics for the wireless network, wherein each candidate from the first set of one or more candidate network deployment configurations is defined based on respective values of the one or more design parameters, wherein the second deep neural network is trained to minimize a loss function for the one or more network performance metrics, in which the one or more network performance metrics is a user throughput representing an average amount of data received by a connected user, and wherein the loss function of the second deep neural network equals an inverse of an average of the user throughput taken over a second set of one or more candidate network deployment configurations that includes the first set of one or more candidate network deployment configurations; and
    selecting from the first set of one or more candidate network deployment configurations an optimal candidate network deployment configuration providing a maximal performance of the wireless network as defined based on the one or more network performance metrics.

7. The non-transitory machine-readable storage medium of claim 6, wherein the wireless network is a radio access network.

8. The non-transitory machine-readable storage medium of claim 7, wherein the one or more design parameters include one or a combination of an inter site distance between base stations of the radio access network, an antenna tilt angle of antennas in the radio access network, and a traffic load.

9. The non-transitory machine-readable storage medium of claim 7, wherein the one or more design parameters further include one or a combination of an altitude of a user equipment, a number of antenna sectors, carrier frequency, a number of antenna elements, an antenna pattern, a configuration parameter of a base station of the radio access network, a configuration parameter of the user equipment, investment costs, and operational costs.

10. The non-transitory machine-readable storage medium of claim 7, wherein the one or more network performance metrics includes one or a combination of signal to noise plus interference ratio, signal-to-interference-ratio, and signal-to-noise ratio, and reference signal received power, and user throughput, a measure of resource utilization, a measure of resilience of the radio access network, an measure of energy efficiency for the radio access network, and a measure of cost efficiency for the radio access network.

11. An apparatus comprising:
a non-transitory machine-readable storage medium that provides instructions that, if executed by a processor, will cause the apparatus to perform operations comprising:
using a first deep neural network to obtain a function that represents a relationship between one or more design parameters of a wireless network and one or more network performance metrics of the wireless network;
using a second deep neural network to obtain a first set of one or more candidate network deployment configurations that optimize the one or more network performance metrics for the wireless network, wherein each candidate from the first set of one or more candidate network deployment configurations is defined based on respective values of the one or more design parameters, wherein the second deep neural network is trained to minimize a loss function for the one or more network performance metrics, in which the one or more network performance metrics is a user throughput representing an average amount of data received by a connected user, and wherein the loss function of the second deep neural network equals an inverse of an average of the user throughput taken over a second set of one or more candidate network deployment configurations that includes the first set of one or more candidate network deployment configurations; and
selecting from the first set of one or more candidate network deployment configurations an optimal candidate network deployment configuration providing a maximal performance of the wireless network as defined based on the one or more network performance metrics.

12. The apparatus of claim 11, wherein the wireless network is a radio access network.

13. The apparatus of claim 12, wherein the one or more design parameters include one or a combination of an inter site distance between base stations of the radio access network, an antenna tilt angle of antennas in the radio access network, and a traffic load.

14. The apparatus of claim 12, wherein the one or more design parameters further include one or a combination of an altitude of a user equipment, a number of antenna sectors, carrier frequency, a number of antenna elements, an antenna pattern, a configuration parameter of a base station of the radio access network, a configuration parameter of the user equipment, investment costs, and operational costs.

15. The apparatus of claim 12, wherein the one or more network performance metrics includes one or a combination of signal to noise plus interference ratio, signal-to-interference-ratio, and signal-to-noise ratio, and reference signal received power, and user throughput, a measure of resource utilization, a measure of resilience of the radio access network, an measure of energy efficiency for the radio access network, and a measure of cost efficiency for the radio access network.

\* \* \* \* \*